Figure 1:
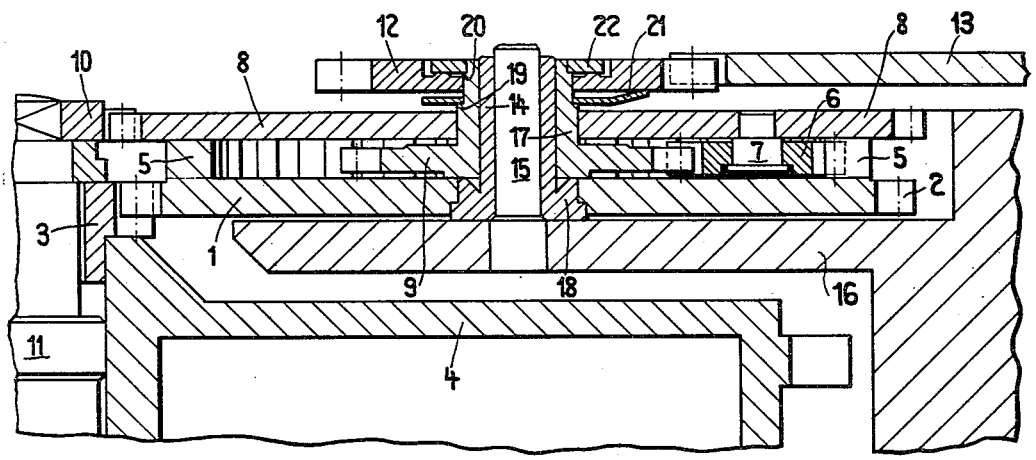

Dec. 18, 1956  F. MEYER  2,774,252

DIFFERENTIAL GEAR

Filed July 26, 1955

INVENTOR
Friedrich Meyer
BY
Edward P. Connors
ATTORNEY

United States Patent Office 2,774,252
Patented Dec. 18, 1956

2,774,252

DIFFERENTIAL GEAR

Friedrich Meyer, Grenchen, Switzerland, assignor to Felsa S. A., Grenchen, Switzerland Application July 26, 1955, Serial No. 524,342

Claims priority, application Switzerland September 4, 1954

3 Claims. (Cl. 74—674)

The present invention relates to a differential gear for timepiece movements, such a differential gear being used for instance in devices indicating the development condition of the mainspring of a timepiece movement or in self-winding devices of timepiece movements having a lockable oscillating weight.

There exist already differential gears comprising two transmission wheels mounted coaxially with each other, each of which engages another driving member, one of these wheels carrying a planet wheel which meshes on the one hand with a sun wheel mounted coaxially with these transmission wheels and on the other hand with a second toothing of the other transmission wheel, whereas the sun wheel transmits its movement to a driven wheel mounted coaxially with the same. In these known constructions, which may be used in devices indicating the development condition of the mainspring of a timepiece movement, both transmission wheels are freely mounted on a sleeve, whereas the sun wheel is rigidly fixed to the said sleeve.

When the said known differential gear is used for the above-mentioned indicating devices, the driven wheel has to be connected to the sun wheel by a friction coupling. For this purpose, in the above-mentioned known solution, one of the ends of the sleeve is split and somewhat conical, so that the driven wheel is frictionally mounted on the sleeve and is not driven if a certain resistance is exceeded when the sleeve is further rotated. Both transmission wheels, the sun wheel and the driven wheel are mounted on the sleeve so as to be maintained thereon in the axial direction and can be placed as a whole by means of the sleeve on a pin fixed to the pillar-plate of the movement. This set can be removed from the pin in the same simple way. The solution which has just been described offers however certain drawbacks. Experience has shown indeed that the position of the transmission wheels and of the sun wheel is not sufficiently guaranteed with respect to the sleeve. On the other hand, the parts of the gear being maintained axially on the sleeve, the watch repairer cannot disassemble the gear and has some difficulty in oiling it.

It is an object of the invention to provide a differential gear of the type referred to, in which one of the transmission wheels is rigidly fixed to the sleeve, the outer surface of the sleeve acting as a bearing surface for the sun wheel.

Therefore, one of the transmission wheels and the sleeve form a rigid support for the other parts of the differential gear, so that the said parts can be maintained exactly in their place both in radial and axial direction. The hub of the sun wheel may be made long enough so that its outer surface acts as a bearing surface for the other transmission wheel. As the driven wheel too can be mounted onto the hub of the sun wheel, all of the parts of the differential gear, except one of the transmission wheels, are mounted on this hub, which is rotatably mounted on the sleeve. The watch repairer, therefore, can separate the differential gear into two portions, so that he can easily oil all of the parts of the gear.

In case the driven wheel is not rigidly fixed to the sun wheel, but is connected thereto by means of a friction coupling, the driven wheel may be pressed against a washer fixed to the hub of the sun wheel by a spring supported by a shoulder of the hub of the sun wheel. It is therefore no longer necessary to split the end of the sleeve.

Other objects and features will be apparent as the following description proceeds, reference being had to the accompanying drawings illustrating by way of example one embodiment of my invention, and wherein Fig. 1 is a cross-sectional view of the differential gear mounted in a timepiece movement.

Figure 2:
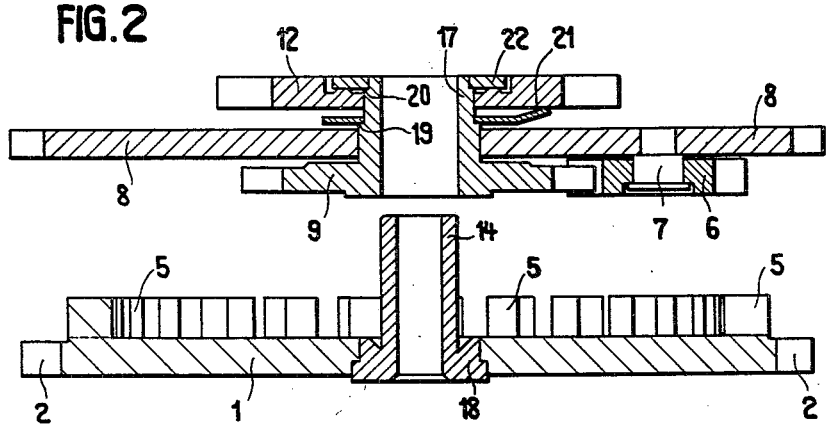

Fig. 2 is an exploded view of the differential gear shown in Fig. 1, illustrating how the same can be separated into two parts.

The transmission wheel 1 has a first toothing 2 engaging a pinion 3 rigidly fixed to the barrel 4 of the timepiece movement, this pinion forming one of the driving means for the differential gear disclosed in Patent No. 2,720,747. The transmission wheel 1 has, besides, a second toothing 5 formed sideways and comprising a projecting annulus which has been milled at spaced intervals. The toothing 5 meshes with a planet wheel 6 which is pivoted on a pin 7 carried by a second transmission wheel 8 coaxially mounted with the first transmission wheel 1. The planet wheel 6 also engages a sun wheel 9 coaxial with the wheels 1 and 8. The transmission wheel 8 is in mesh with a pinion 10 rigidly fixed to the barrel arbor 11, this pinion forming the other driving means for the differential gear. The driven wheel 12, which meshes with a wheel 13 indicating the development condition of the mainspring, is connected to the sun wheel 9 by a friction coupling described below.

According to the invention the transmission wheel 1 is rigidly fixed to a sleeve 14 by any suitable means. The sleeve 14 is mounted freely on a pin 15 fixed to the pillar-plate 16 of the timepiece movement and extends over the whole height of the differential gear between the outer faces of the wheels 1 and 12. The hub 17 of the sun wheel 9, which extends over the whole height between the outer faces of the wheels 9 and 12, is rotatably mounted on the sleeve 14 and can be separated therefrom. The sun wheel 9 bears against the inner face of the transmission wheel 1 and of the flange 18 of the sleeve 14. The hub 17 of the sun wheel 9 has a stepped diameter the different portions of which are separated from one another by shoulders 19 and 20. On the portion of greatest diameter is rotatably mounted the transmission wheel 8 which bears on the face of the toothing 5 of the transmission wheel 1. In the other direction, the transmission wheel 8 is axially maintained by a spring washer 21 supported by the shoulder 19 of the hub 17. The spring washer 21 presses the driven wheel 12, which is freely mounted on the middle portion of the hub 17, against a washer 22 resting on the shoulder 20 of the hub 17 and fixed to the latter by caulking of the outer edge of the hub 17.

Since the sleeve 14 forms with the transmission wheel 1 a rigid set, the transmission wheel 1 cannot tilt, so that any meshing defect in the several toothings is avoided. Besides, since the sun wheel 9 not only bears axially on the transmission wheel 1, but also is very well guided upon the sleeve 14 by its long hub 17 and therefore cannot tilt with respect to the sleeve 14, the stabilizing effect of the combined part 1, 14 is fully utilized. The axial maintenance of the transmission wheel 8 by the spring washer 21 extending over the whole periphery of the hub 17, also contributes to attain the purpose sought.

It is not only possible, as with the known constructions, to remove the whole differential gear from the pin 15 fixed to the pillar-plate 16, without beforehand disassembling any part of this gear, but it is also possible, as shown in Fig. 2, to separate as a whole set the parts 9, 8, 6, 21, 12, 22 from the sleeve 14 and therefore from the wheel 1. Owing to this arrangement, the bearing surfaces situated between the parts 14 and 17, 17 and 8 and between the planet wheel 6 and its pin 7 are very easily accessible for being oiled, as they are no longer masked by the transmission wheel 1.

The differential gear of the illustrated embodiment is held axially as a whole between the pillar-plate 16 of the timepiece movement and a dial-holder (not shown) screwed onto the pillar-plate 16. If the whole differential gear or only the upper portion shown in Fig. 2 is to be removed, it is sufficient to unscrew the said dial-holder.

According to the use for which the differential gear is intended, the driven wheel 12 may be rigidly fixed to the sun wheel 9, instead of being connected thereto by a friction coupling.

While I have shown and described one embodiment, I do not wish to unnecessarily limit the scope of my invention thereto but reserve the right to make such modifications and rearrangements of the several parts as may come within the purview of the accompanying claims.

What I claim is:

1. In a differential gear for timepiece movements, a first toothed transmission wheel having crown teeth extending laterally from the median plane of the wheel, a sleeve rigidly and coaxially connected with said first transmission wheel to extend towards the side of said crown teeth, a mover unit pivoted on said sleeve to be separated as a whole from said sleeve and comprising, a sun wheel axially supported by said first transmission wheel, a hub integral with said sun wheel, detachably pivoted on said sleeve and extending away from said first transmission wheel, a second toothed transmission wheel coaxially pivoted on said hub and held at a distance from said first toothed transmission wheel by said crown teeth, a planet wheel carried by said second toothed transmission wheel and in mesh with said sun wheel and said crown teeth, a driven wheel coaxially mounted on said hub, and means holding said second transmission wheel and said driven wheel at an axial distance from each other on said hub.

2. In a differential gear for timepiece movements, a first toothed transmission wheel having crown teeth extending laterally from the median plane of the wheel, a sleeve rigidly and coaxially connected with said first transmission wheel to extend towards the side of said crown teeth, a mover unit pivoted on said sleeve to be separated as a whole from said sleeve and comprising, a sun wheel axially supported by said first transmission wheel, a hub integral with said sun wheel, detachably pivoted on said sleeve and extending away from said first transmission wheel, a second toothed transmission wheel coaxially pivoted on said hub and held at a distance from said first toothed transmission wheel by said crown teeth, a planet wheel carried by said second toothed transmission wheel and in mesh with said sun wheel and said crown teeth, a driven wheel coaxially mounted on and in frictional drive connection with said hub, and a spring supported on said hub and on said driven wheel to hold said second transmission wheel and said driven wheel at an axial distance from each other on said hub and to provide for driving friction effect onto said driven wheel.

3. In a watch movement, a frame piece, a pin fixed to said frame piece, a differential gear pivoted on said pin to be detached as a whole set from said pin and including, a first toothed transmission wheel having crown teeth extending laterally from the median plane of the wheel, a sleeve rigidly and coaxially connected with said first transmission wheel to extend towards the side of said crown teeth, a mover unit pivoted on said sleeve to be separated as a whole from said sleeve and comprising, a sun wheel axially supported by said first transmission wheel, a hub integral with said sun wheel, detachably pivoted on said sleeve and extending away from said first transmission wheel, a second toothed transmission wheel coaxially pivoted on said hub and held at a distance from said first toothed transmission wheel by said crown teeth, a planet wheel carried by said second toothed transmission wheel and in mesh with said sun wheel and said crown teeth, a driven wheel coaxially mounted on said hub, and means holding said second transmission wheel and said driven wheel at an axial distance from each other on said hub.

References Cited in the file of this patent

UNITED STATES PATENTS

| | | |
|---|---|---|
| 1,789,169 | Chilton | Jan. 13, 1931 |
| 2,591,819 | Huguenin | Apr. 8, 1952 |
| 2,720,747 | Meyer | Oct. 18, 1955 |